(12) United States Patent
Elder et al.

(10) Patent No.: US 11,069,016 B2
(45) Date of Patent: Jul. 20, 2021

(54) NATIONAL DIGITAL IDENTITY

(71) Applicant: MasterCard International Incorporated, Purchase, NY (US)

(72) Inventors: Stephen Elder, Dublin (IE); Joseph Mitchell, Sandymount (IE); John Sheldon, Chatham, NJ (US); Ken Moore, Greystones (IE); Gregory O'Brien, Dublin (IE); Sinead Fitzgerald, Dublin (IE); Derek Humphreys, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 364 days.

(21) Appl. No.: 15/825,402

(22) Filed: Nov. 29, 2017

(65) Prior Publication Data
US 2018/0330459 A1 Nov. 15, 2018

Related U.S. Application Data

(60) Provisional application No. 62/504,219, filed on May 10, 2017.

(51) Int. Cl.
*G06Q 10/10* (2012.01)
*G06Q 30/02* (2012.01)
(Continued)

(52) U.S. Cl.
CPC ........... *G06Q 50/265* (2013.01); *G06F 21/32* (2013.01); *G06F 21/36* (2013.01);
(Continued)

(58) Field of Classification Search
CPC .. G06Q 50/265; G06Q 20/3674; G06Q 20/02; G06Q 20/3274; G06Q 20/3276;
(Continued)

(56) References Cited

U.S. PATENT DOCUMENTS 8,955,073 B1 * 2/2015 Scott ..................... G06F 21/34
726/7
9,413,757 B1 * 8/2016 Sadacharam ....... H04L 63/0861
(Continued)

OTHER PUBLICATIONS

"PCT International Search Report and Written Opinion" for PCT Application No. PCT/US2018/028492 dated Jul. 10, 2018, 12 pp.
(Continued)

*Primary Examiner* — Jonathan P Ouellette
(74) *Attorney, Agent, or Firm* — Buckley, Maschoff & Talwalkar LLC

(57) ABSTRACT

Provided are an identity broker system and method for managing a national digital identification of a citizen. In one example, the method includes receiving, from a user device, an identity sharing request of a citizen including an identification of a service provider with which to share the identity, determining one or more digital identification credentials of the citizen that are to be shared with the service provider based on the identity sharing request, receiving an authorization from the citizen via the user device, the authorization including an approval for sharing the one or more digital identification credentials of the citizen with the service provider, and receiving the one or more digital identity components of the citizen from an identity record providing device, and transmitting the one or more digital identification credentials of the citizen to a service provider device based on the identification of the service provider.

18 Claims, 5 Drawing Sheets

(51) Int. Cl.

| | |
|---|---|
| *G06Q 40/08* | (2012.01) |
| *G06Q 10/08* | (2012.01) |
| *G06Q 50/26* | (2012.01) |
| *G06Q 20/36* | (2012.01) |
| *G06F 21/32* | (2013.01) |
| *G06Q 20/02* | (2012.01) |
| *G06Q 20/32* | (2012.01) |
| *G06Q 20/40* | (2012.01) |
| *G06F 21/62* | (2013.01) |
| *G06F 21/36* | (2013.01) |
| *G06K 19/06* | (2006.01) |

(52) U.S. Cl.
CPC ......... *G06F 21/6245* (2013.01); *G06Q 20/02* (2013.01); *G06Q 20/3274* (2013.01); *G06Q 20/3276* (2013.01); *G06Q 20/3674* (2013.01); *G06Q 20/4014* (2013.01); *G06Q 20/40145* (2013.01); *G06K 19/06037* (2013.01)

(58) Field of Classification Search
CPC .......... G06Q 20/40145; G06Q 20/4014; G06F 21/32; G06F 21/6245; G06F 21/36; G06K 19/06037
USPC ........................................... 705/1.1–912, 325
See application file for complete search history.

(56) References Cited

U.S. PATENT DOCUMENTS

| | | | |
|---|---|---|---|
| 9,603,019 B1* | 3/2017 | Ramatchandirane | ........................ G06Q 20/401 |
| 9,805,213 B1* | 10/2017 | Kragh | ................... G06F 16/245 |
| 2012/0330769 A1* | 12/2012 | Arceo | ..................... G06Q 20/32 705/21 |
| 2013/0178721 A1 | 7/2013 | Bird et al. | |
| 2013/9219479 | 8/2013 | DeSoto, et al. | |
| 2014/0229388 A1* | 8/2014 | Pereira | ................... G06Q 20/12 705/76 |
| 2015/0058950 A1* | 2/2015 | Miu | ................... G06Q 20/4014 726/7 |
| 2015/0059003 A1* | 2/2015 | Bouse | ................... H04L 63/102 726/28 |
| 2015/0178721 A1 | 6/2015 | Pandiarajan et al. | |
| 2015/0206126 A1* | 7/2015 | Zeinecker | ........... H04L 63/0853 705/44 |
| 2017/0200151 A1* | 7/2017 | Bruno | ..................... H04W 4/80 |
| 2017/0214684 A1* | 7/2017 | Gupta | ................ G06K 9/00892 |
| 2017/0250972 A1* | 8/2017 | Ronda | ................... H04L 9/3236 |
| 2018/0227458 A1* | 8/2018 | Mart Ascencio | .. H04N 1/00278 |
| 2018/0254909 A1* | 9/2018 | Hancock | ............... H04L 9/3268 |
| 2019/0273959 A1* | 9/2019 | Simmons | ........... H04N 21/4821 |
| 2019/0281456 A1* | 9/2019 | Kelts | ...................... H04L 67/10 |
| 2019/0334884 A1* | 10/2019 | Ross | ....................... G06F 21/31 |
| 2019/0394043 A1* | 12/2019 | Fontaine | ................... H04L 9/30 |

OTHER PUBLICATIONS

European Examination Report dated May 25, 2021 which was issued in a counterpart application EP18723199.8.

* cited by examiner

NATIONAL DIGITAL IDENTITY

BACKGROUND

Recently, consumers have begun associating their payment account information (e.g., credit cards, debit cards, bank accounts, etc.) with different vendors such as merchants and online shopping forums. In addition, consumers are also associating their payment card information with different devices such as mobile phones, tablets, smart wearable devices, appliances, televisions, and the like. One such application that helps consumers add payment credentials to their device is a digital wallet also referred to as a mobile wallet. Mobile payments can be performed using a digital wallet. A digital wallet is typically an application on a mobile device in which a user retains information about their payment credentials. The digital wallet is activated when making a transaction and an appropriate payment vehicle is selected from the digital wallet to provide funds for the transaction. The merchant then uses this information to authorize the transaction.

However, digital wallets are typically limited to payment account information and are not capable of providing access to official government records or to other secure documents such as medical files, voter registration, and the like. Furthermore, in a world increasingly governed by digital data and digital transactions, our existing methods of managing identity and data security are proving inadequate. Large-scale fraud, identity theft and data breaches are quite prevalent, and a large amount of the population has only the most limited digital credentials or none at all. Accordingly, what is needed is a technology for identity management that genuinely enables trusted, auditable sharing relationships and functions without compromising personal anonymity or security.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings.

Figure 1:
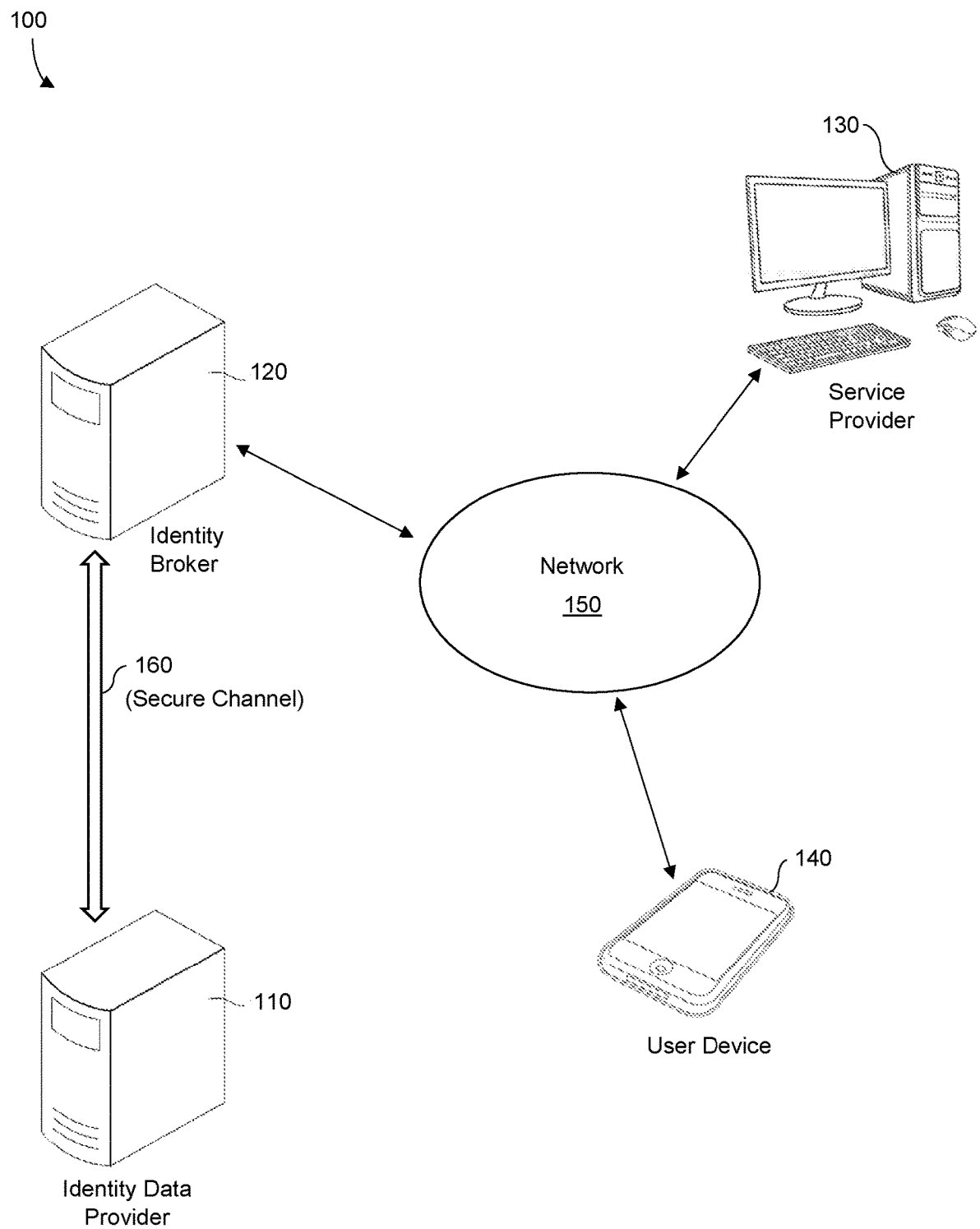
FIG. 1 is a diagram illustrating an identity broker network for managing a national digital identification in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will understand that the embodiments may be practiced without the use of these specific details. In other instances, well-known structures and processes are not shown or described in order not to obscure the description with unnecessary detail. Thus, the present disclosure is not intended to be limited to the embodiments shown, but should be accorded the widest scope consistent with the principles and features disclosed herein.

The example embodiments are directed to a system and method for managing a national digital identification (ID) for citizens of a government or other established authority. The national digital ID may be associated with a mobile application or other software installed on a user device associated with a citizen. The mobile application enables the user to communicate with various government and other official agencies in order to retrieve and authorize use of official documents and data included therein such as birth certificates, passports, driver's licenses, social security records, death records, health records, medical files, voter registration data, and the like. However, instead of communicating directly with these agencies, the example embodiments provide an identity broker network or system in which an identity broker (e.g., payment processor, financial institution, etc.) acts as an intermediary between the citizen and the official government agency. The identity broker is a trusted entity that can manage digital requests, user and device authentication, and receive authorization from the citizen. Also, the identity broker can facilitate the retrieval of official digital records and other credentials and provide the credentials to a service provider selected by the user. For example, the identity broker may obtain government documents from a government agency and provide the government records to a service provider.

In some embodiments, a payment processor such as MasterCard Inc. may be the identity broker. In this example, the payment processor is already in a unique position to use pre-existing communication networks (e.g., payment networks, secure channels of communication, and the like) which enable secure communications between the payment processor and the user. Furthermore, by using an identity broker instead of dealing directly with the government agency, the user is shielded from view of the government agency thereby preventing the government agency from keeping track of private information of the user. Accordingly, the communications between the identity broker and the user as well as the communications between the identity broker and the service provider can be carried out without government intrusion. Furthermore, the identity broker can be prevented from storing any personally identifiable information of the user thereby further maintaining privacy. The national digital identification application and network enables citizens to have complete control over access to their personal data. Furthermore, with a single press of a button, the user can authorize digital identity credentials to be shared or prevent digital identity credentials from being shared.

In operation, service providers (e.g., merchants, hospitals, pharmacies, hotels, airlines, etc.) may register with the identity broker for inclusion in the national digital identification network and application. During registration, a service provider may receive a QR code or other identifier, mark, command, link, etc., which can be used to identify the respective service provider with the identity broker. Other examples of identifiers besides scannable codes include electronic codes such as codes transmitted via near-field communication (NFC), BLUETOOTH®, radio frequency identification (RFID), and the like. It should be appreciated that QR codes are merely for purposes of example, and the identifier is technique agnostic. When a user begins a transaction such as an application, registration, purchase, or other transaction, with the service provider, the user may scan the service provider's identifier. For example, the identifier may be located on a poster, a paper, a web page, and the like. In response to scanning the service provider's identifier, the mobile application executing on the user device may detect or otherwise determine digital identification credentials that the service provider desires as well as an identification of the service provider, and transmit a request for the digital identification credentials and the identification of the service provider to the identity broker.

In some cases, the identity broker may authenticate the user based on a predefined authentication process such as biometric, password, PIN, and the like, receive approval from the user for sharing the digital identification credentials, and obtain the digital identification credentials from the necessary entity (e.g., government agency, record holder, etc.) In some embodiments, the identity broker may communicate with a government agency via an application programming interface (API) of the government agency which exposes official records and other documents, images, etc., of citizens thereof. Upon obtaining the digital identification credentials, the identity broker can determine which service provider to transmit the digital identification credentials based on the identifier included in the request received from the mobile application executing on the user device, and forward the digital identification credentials to the service provider.

The national digital identification system provides a number of benefits over conventional identity processes which often require a user to visit a government agency in-person, send a letter/request and wait weeks, or conduct a telephone call with an automated system that can take hours, etc. In contrast, the national digital identification network can authenticate a citizen, obtain the official documents, and provide the official documents to a third party with a single click of a button. Citizens no longer need to fill out multiple forms of the same data, and they have confidence that their information is safe because existing payment networks and other secure communication channels can be used to pass information between the user, the identity broker, the government agency, and the merchant/service provider. Furthermore, different levels of security (and different levels of authentication) can be required for a user to access certain identity information. Furthermore, a user can control how much information they share with a service provider. For example, rather than provide a service provider with an entire birth certificate, the service provider may only receive certain details (e.g., place of birth) from the birth certificate without receiving access to the entire birth certificate. Accordingly, the dissemination of identity information can be managed and controlled completely by the user.

The national digital identity may be used as a key that unlocks other data and data sharing functions of a citizen. For example, the national digital identity may have unique and unforgeable credentials that work everywhere, and also the ability to remotely and securely access all the data linked to your identity via a user device. In addition, the national digital identity provides a user with the ability to control a "persona" of that user that is presented in different situations, for example, the "work you", the "health system you", the "government you," and many others, by controlling what data is shared with what entities.

FIG. 1 illustrates an identity broker network 100 for managing a national digital identification in accordance with an example embodiment. The identity broker network 100 provides for a fast dissemination of user information with extremely high security, with a single click of a button by a user. For merchants and other service providers, the national digital identity application can reduce fraudulent activity by improving security of personal data delivered to merchants, increase operation efficiency, reduce risk and increase overall customer experience. Also, for consumers (users), the national digital ID application removes the need for many different passwords, reduces the distribution of sensitive and critical personal information, and improves user experience when interacting with government agencies by allowing information to be shared without the user having to fill out paperwork, show up in-person, or make a phone call.

Referring to FIG. 1, the identity broker network 100 includes an identity broker 120 which may be a payment processor, financial institution, or other trusted entity. The identity broker network 100 also includes an identification data provider 110, a service provider 130, and a user device 140. In this example, the identity broker 120, the service provider 130, and the user device 140, are connected to each other via a network 150 such as the Internet, private network, and the like. Meanwhile, the identity data provider 110 (which may be a federal or other government agency) is connected to the identity broker 120 via a secure channel which may include regulation and encryption. For example, the identity data provider 110 may include identification provider parties and other government affiliated agencies capable of providing official identification documents and records of a user. These official records may include digital motor vehicle (DMV) records, social security agency records, passport records, birth certificate records, death certificate records, marriage certificate records, and the like.

The data provided by identification providers 110 may have different levels of security with certain information such as passport information, social security numbers, and the like, having a higher level of required security than information such as date of birth, address, and the like. In one example, the data includes four levels, however, the embodiments are not limited thereto. As a non-limiting example, the levels of security may be based on a type of data being secured. As a non-limiting example, a highest level of security may be intended for situations where a person has data that is relevant to imminent danger or a position of trust, a next highest level where the data physically identifies the person to whom the identity belongs (DNA, etc.), a next highest level where the data identifies a real-world existence of a person (driver's license, passport, birth certificate, social security, etc.) and a lowest level where the data is basic user information such as name, address, date of birth, age, etc. When receiving a request for identity data from the user device 140, the identity broker 120 may control the level of authentication performed based on the digital identity credential or credentials being requested.

According to various embodiments, the identity data provider 110 may expose official records and identification documents via an application programming interface which is accessible by the identity broker 120 via the secure channel 160. Although not shown in the example of FIG. 1, in some examples, national digital ID application executing on the user device 140 may interact directly and receive data directly from the identity data provider without the identity broker 120. The service provider 130 may be a merchant or other vendor that need identification data of a user. For example, the service provider 130 may include airlines, corporations, job agencies, car rental agencies, hotels, bars/restaurants, and the like. As another example, the service provider 130 may include voting registration offices, social welfare, medical agencies, pharmacies, and the like. The user device 140 may be a computing device such as smartphone, a tablet, a smart-wearable device, a notebook computer, a laptop, a personal computer, and the like.

Some of the benefits of using a payment processor as the identity broker 120 is that existing financial and secure relationships already exist between payment processors and government agencies, merchants, and consumers. According to various embodiments, the identity broker 120 may not store any secure data (e.g., personal identifiable information (PII), transaction data, financial data, etc.) of the user but instead may simply allow the data to pass through from the government agency or other identification data provider 110 to the user device 140. Accordingly, the identity broker 120 can maintain a commitment to pending regulations such as Fast Identity Online (FIDO) and General Data Protection Regulation (GPDR) while at the same time provide a solution for the most privacy-sensitive jurisdictions (e.g., Germany, Latin America, France, etc.) For example, the identity broker 120 can provide that it created a transaction on behalf of a citizen, including a notice of the request, however, the identity broker 120 cannot create the national identity data credentials that were provided as a result of the request. Also, government agencies or other identification data providers are not given visibility into specific citizen commercial, voting, medical, etc., information.

Figure 2:
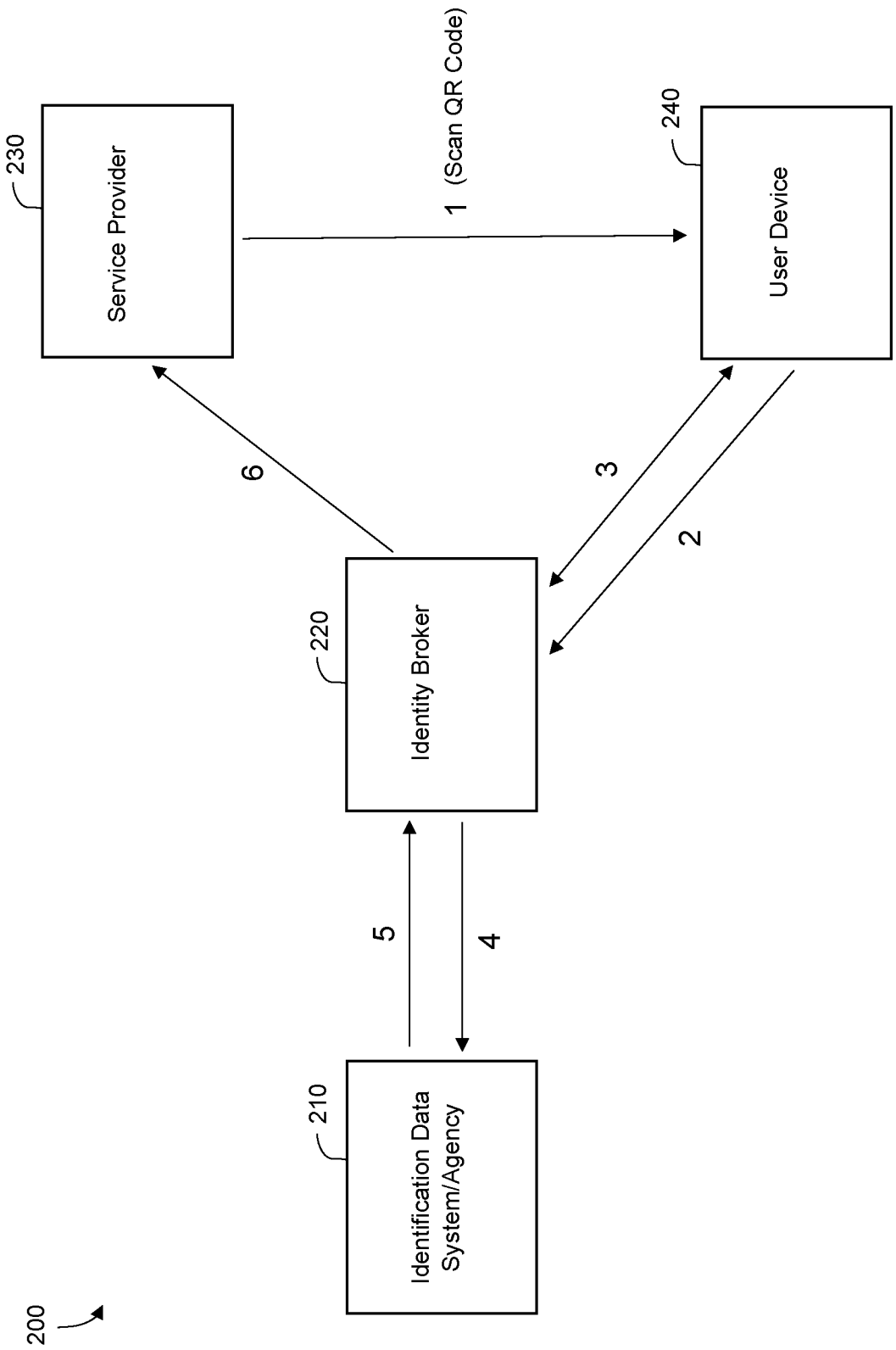
FIG. 2 is a diagram illustrating a process of managing a national digital identification in accordance with an example embodiment.

FIG. 2 illustrates a process 200 of providing digital identity credentials to a service provider, in accordance with an example embodiment. In this example, the process is performed by a digital identification management network 200 that is similar to the identity broker network as shown in FIG. 1. Referring to FIG. 2, the digital identification management network includes an identification data system 210, an identity broker 220, a service provider 230, and a user device 240. In a first step, the user device 240 receives a code, link, or other symbol from the service provider 230. Here the service provider 230 may be a computing device associated with a merchant or other vendor such as a hospital, a bank, an airline, a car-rental agency, a hotel, another merchant, and the like. It should also be appreciated that the service provider 230 may be a provider of any type of application that could benefit from identifying a person, and not just those specifically mentioned. In other words, the service provider 230 may be used with any new future applications or previously developed applications not specifically discussed herein.

In one example, the user device 240 may scan a QR code associated with the service provider 230 which has been previously established with the identity broker 220. Based on the data received from the service provider 230, the user device 240 can determine the personal digital credentials that the service provider 230 desires, and forward a notification of the personal digital credentials along with an identifier of the service provider 230 to the identity broker 220 in a second step.

In response to receiving the request from the user device 240, in a third step the identity broker 220 may authenticate a citizen associated with the request. The citizen may be identified from a mobile application executing on the user device 240 and information about the citizen may be provided with the request. The authentication process may include different types of authentication based on a security level of the data being requested. For more secure data, a more secure authentication process (e.g., biometric) may be performed. In addition to the authentication, the third step may also provide a user interface to the citizen via the user device 240.

Figure 3:
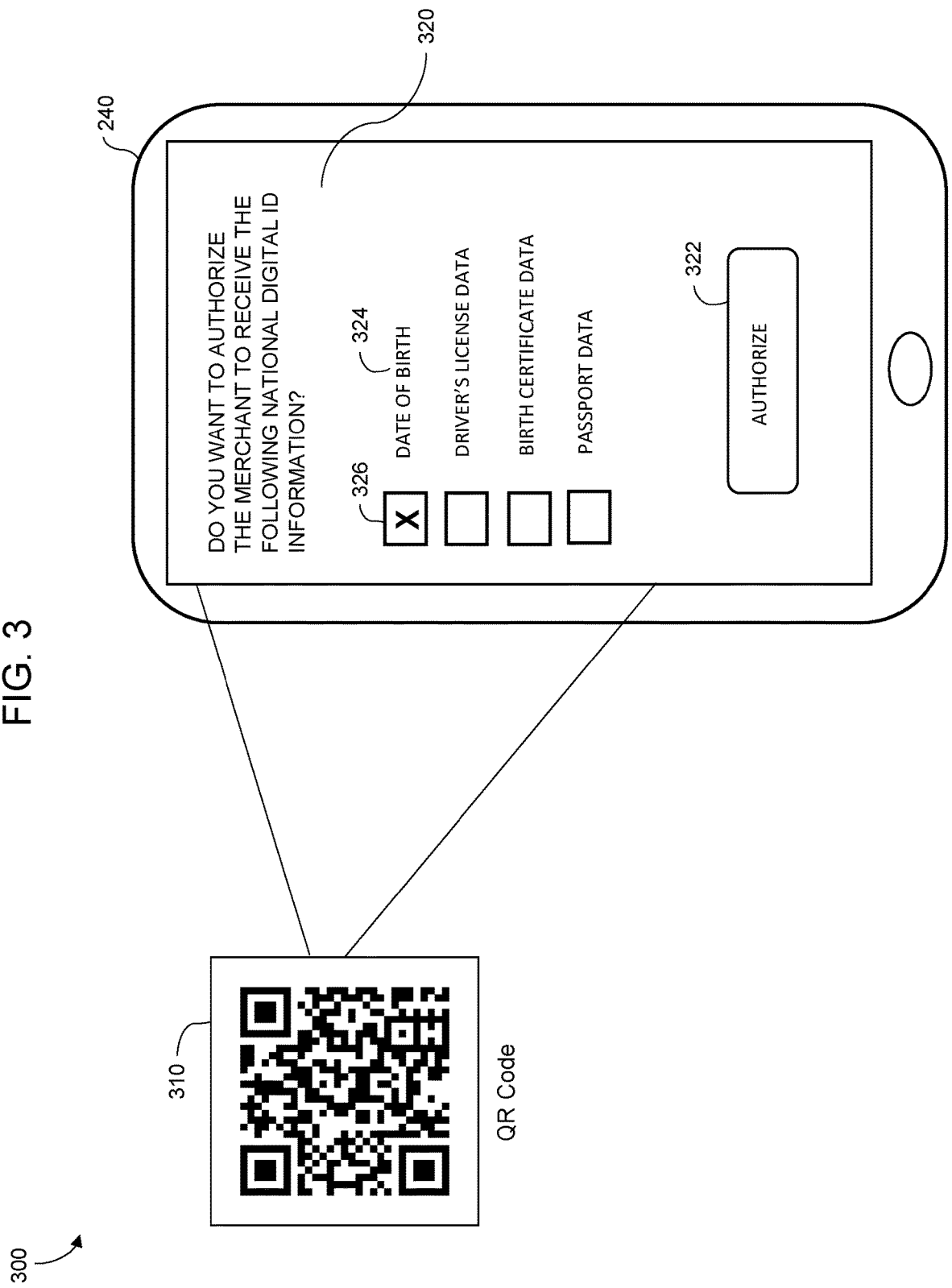
FIG. 3 is a diagram illustrating a QR code scanning process for requesting digital credentials in accordance with an example embodiment.

An example of the user interface is shown in FIG. 3. In particular, in FIG. 3, a QR code 310 is scanned by the user device 240 and forwarded to the identity broker 220. In response, the identity broker 220 cause user interface 320 to be displayed on the screen of the user device 240. In this example, the user interface 320 includes a list of digital identity credentials 324 including date of birth, driver's license data, birth certificate data, and passport data. In addition, a selection box 326 is shown next to each digital identity credential 324 enabling a user to choose which credentials to authorize to be shared with the service provider 230. Here, the digital identity credentials 324 may be taken from official digital records that are managed by government agencies. After the citizen has decided which digital identity credentials 324 to share, the user may press the authorize button 322.

Referring again to FIG. 2, after authenticating the citizen and receiving authorization for sharing digital identity credentials from the citizen, in a fourth step, the identity broker 220 transmits a request to the identification data system 210 and in a fifth step receives the digital identity credentials therefrom. Furthermore, in a sixth step, the identity broker 220 provides the digital identity credentials to the service provider 230 based on the identification of the service provider received in the second step. In this case, the digital identity credentials may not be stored by the identity broker 220. That is, the identity broker 220 may not store personal identifiable information of the citizen.

Figure 4:
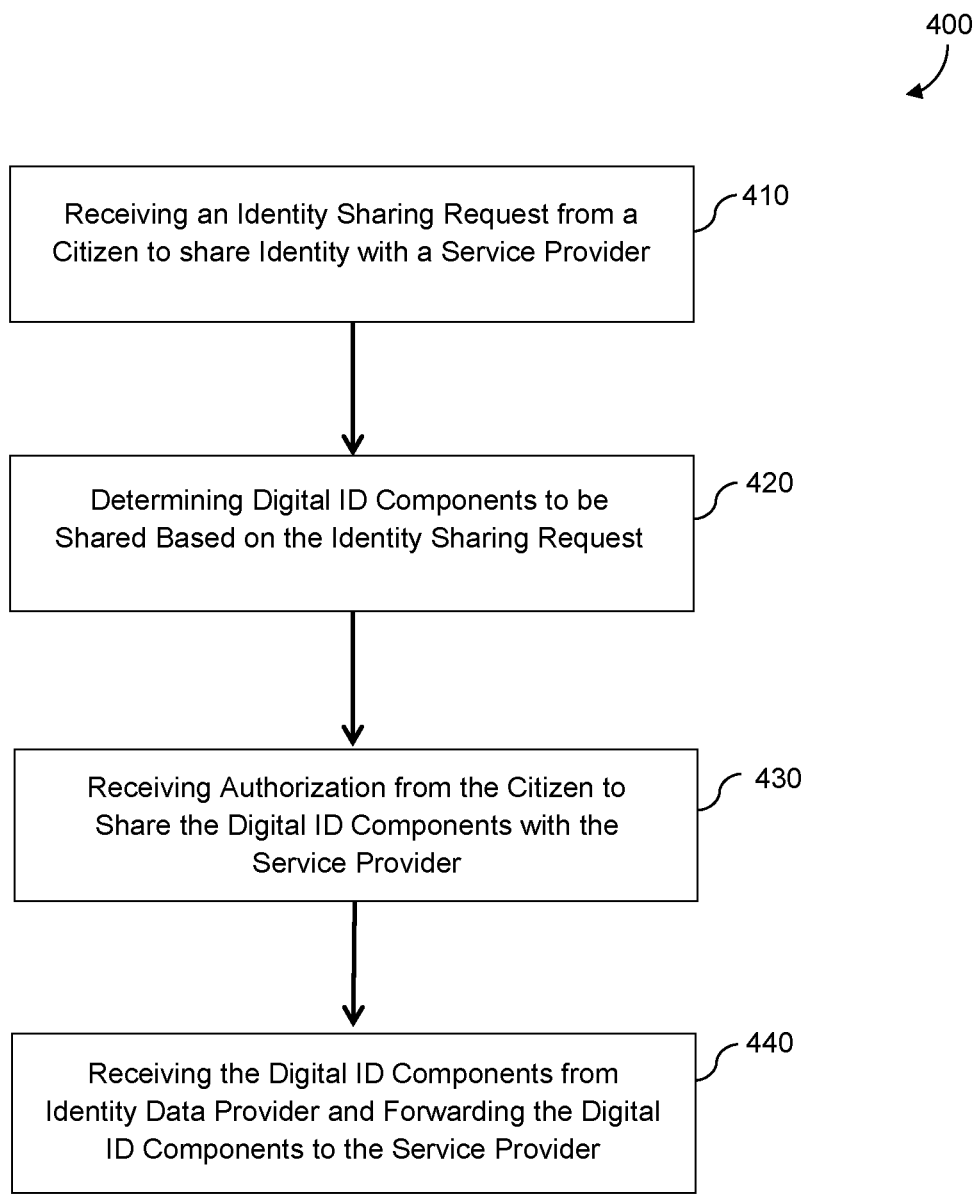
FIG. 4 is a diagram illustrating a method for providing digital credentials of a national digital identification in accordance with an example embodiment.

FIG. 4 illustrates a method 400 for providing digital components of a national digital identification in accordance with an example embodiment. For example, the method 400 may be performed by a computing device such as identity broker 120 shown in FIG. 1, which may include a computer, a server, a cloud computing platform, and the like. Referring to FIG. 4, in 410, the method includes receiving, from a user device, an identity sharing request of a citizen including an identification of a service provider with which to share the identity. The user device may be a mobile device associated with the citizen and executing a mobile application as described herein for a national digital ID. The identity sharing request may be generated based on the user device scanning a code (e.g., QR code) or other identifier, or entering a command, link, etc., using the mobile application.

The QR code may be provided by the service provider (e.g., vendor, merchant, etc.) for example by placing the QR code on a poster, wall, sheet of paper, web page, etc. For example, the service provider may include a hospital, a financial institution, a hotel, an airline, a car-rental agency, and the like. In the example of the QR code, the QR code may have an indication of the one or more digital identity components embedded therein such that when the QR code is scanned, the digital identity components are learned by the mobile application. In addition, the identity sharing request may include an identification of the service provider, for example, an arbitrary identification number, a URL, a network address, a name, and the like. Based on the identity sharing request received from the user device, the identity broker can ascertain an identification of the service provider and a list of information that the service provider desires about the user/citizen.

In 420, the method includes determining one or more digital identity components that are to be shared with the service provider based on the identity sharing request. According to various embodiments, the identity sharing request may identify one or more digital identity components that the service provider (e.g., vendor, merchant, etc.) desires from the citizen. Here, the digital identity components may be specific information such as date of birth, address, social security number, etc. As another example, the digital identity components may include official documents such as a passport, driver's license, birth certificate, social security card, and the like. The digital identity components may include digital data and records that can be provided to the service provider in the form of a digital medium (e.g., image, email, message, etc.) and transferred via a communication network such as the Internet, a private network, a cellular network and the like.

In 430, the method further includes receiving an authorization from the citizen via the user device. The authorization includes an approval for sharing the one or more digital identity components of the citizen with the service provider. For example, the user/citizen may check or otherwise select the documents and data that the user desires to share with the service provider, and send the selections back to the identity broker. In some embodiments, the authorization may include authenticating the citizen via the user device through a biometric authentication process, prior to receiving the authorization from the citizen. For example, the biometric authentication may include a retinal scan, fingerprint, voice recognition, facial recognition, and the like.

In 440, the method further includes receiving the one or more digital identity components of the citizen from an identity record providing device, and transmitting or forwarding the one or more digital identity components of the citizen to a service provider device based on the identification of the service provider. According to various embodiments, the one or more digital identity components received from the identity data providing device may include PII of the citizen, and the PII may not be stored by the identity broker device. As a result, the identity broker may satisfy various requirements of jurisdictions which limit the type and amount of information about a citizen that can be stored. The identity record providing device may be associated with a government agency that manages one or more of an official birth certificate record, an official social security record, and an official passport record, of the citizen. As another example, the identity record providing device may be a third party that also has ability to store and access official user documents. According to various embodiments, the identity broker may obtain the one or more digital identity components of the citizen from an API of the identity data providing device which makes available official documents to the identity broker via a secure channel.

Figure 5:
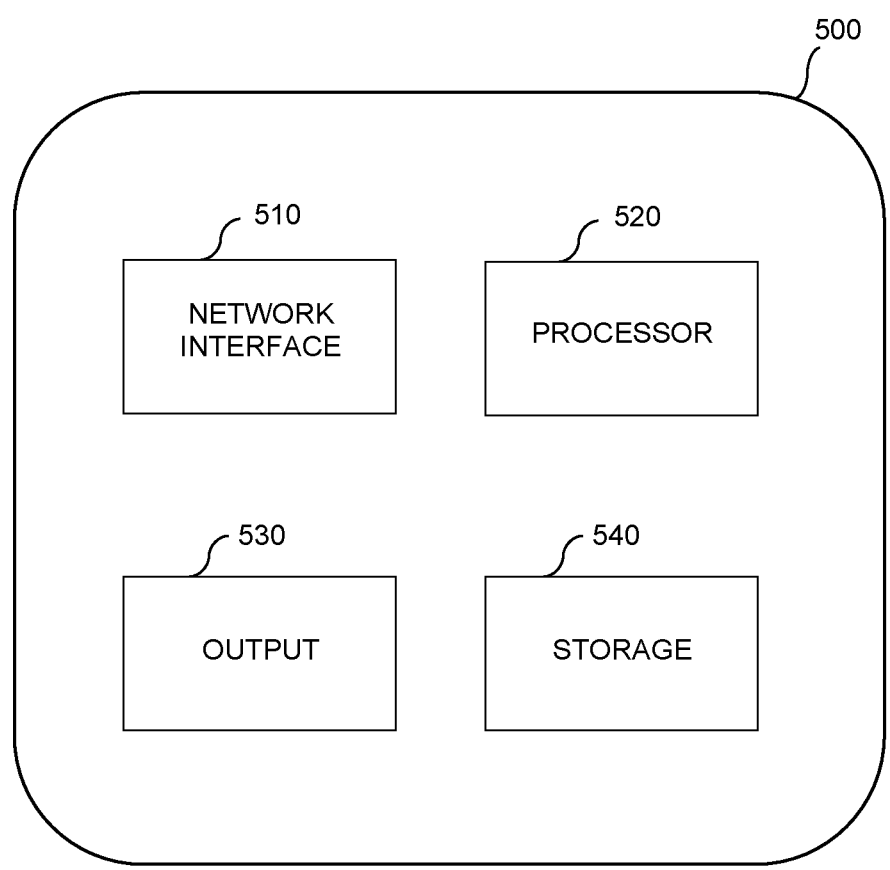
FIG. 5 is a diagram illustrating a computing system for providing digital credentials of a national digital identification in accordance with an example embodiment.

FIG. 5 illustrates a computing system 500 for providing digital components of a national digital identification in accordance with an example embodiment. The computing system 500 may be the identity broker 120 shown in FIG. 1, or another computing device or group of computing devices. Referring to FIG. 5, the computing system 500 includes a network interface 510, a processor 520, an output 530, and a storage device 540. Although not shown in FIG. 5, the computing system 500 may include other components such as a display, an input unit, a receiver/transmitter, and the like. The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The processor 520 may control the other components of the computing system 500. The output 530 may output data to an embedded display of the computing system 500, an externally connected display, a cloud, another device, and the like. The storage device 540 is not limited to any storage device and may include any known memory device such as RAM, ROM, hard disk, and the like.

According to various embodiments, the network interface 510 may receive, from a user device, an identity sharing request of a citizen including an identification of a service provider with which to share the identity. The user device may be associated with the citizen and may be connected to the computing system 500 via a network such as the Internet. Also, the user device may execute a mobile application therein that is controlled by the computing system 500 or an entity associated with the computing system 500. The identity sharing request may be generated based on a quick response (QR) code being scanned by the user device, and the QR code may include an indication of the one or more digital identity components embedded therein. The processor 520 may identity or otherwise determine one or more digital identity components that are to be shared with the service provider based on the identity sharing request. Here, the one or more digital identity components may include digital data and records such as documents, images, messages, and the like, such as one or more of a digital birth certificate record, a digital social security record, and a digital passport record, of the citizen.

The network interface 510 may receive an authorization from the citizen via the user device. For example, the authorization may include an approval for sharing the one or more digital identity components of the citizen with the service provider. In addition, the processor 520 may also authenticate the citizen via the user device through a biometric authentication process, prior to receiving the authorization from the citizen. The network interface 510 may further receive the one or more digital identity components of the citizen from an identity record providing device, and transmit the one or more digital identity components of the citizen to a service provider device of the service provider based on the identification of the service provider. For example, the identity record providing device may be associated with a government agency that manages one or more of an official birth certificate record, an official social security record, and an official passport record, of the citizen. In some embodiments, the processor 520 may control the network interface 510 to obtain the one or more digital identity components of the citizen by communicating with an API of the identity data providing device. Also, the one or more digital identity components received from the identity data providing device may include PII of the citizen, and the PII may not be stored by the identity broker device.

As used herein and in the appended claims, the term "payment card account" includes a credit card account, a deposit account that the account holder may access using a debit card, a prepaid card account, or any other type of account from which payment transactions may be consummated. The term "payment card account number" includes a number that identifies a payment card system account or a number carried by a payment card, or a number that is used to route a transaction in a payment system that handles debit card and/or credit card transactions. The term "payment card" includes a credit card, debit card, prepaid card, or other type of payment instrument, whether an actual physical card or virtual.

As used herein and in the appended claims, the term "payment card system" or "payment system" refers to a system for handling transactions such as pushing funds to a payment card which is unique to the exemplary embodiments as well as purchase transactions such as receiving funds from a payment card. An example of such a system is the one operated by MasterCard International Incorporated, the assignee of the present disclosure. In some embodiments, the term "payment card system" may be limited to systems in which member financial institutions issue.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like, and also refer to any suitable payment account such as a deposit account, bank account, credit account, and the like. As another example, the terms may refer to any other device or media that may hold payment account information, such as mobile phones, Smartphones, personal digital assistants (PDAs), key fobs, computers, and the like. The transaction card can be used as a method of payment for performing a transaction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Furthermore, although the example embodiments have been described in connection with specific figures and descriptions, it should be understood that various changes, substitutions, and alterations apparent to those skilled in the art can be made to the disclosed embodiments without departing from the spirit and scope of the present disclosure as set forth in the appended claims.

What is claimed is:

1. A method comprising:
    receiving, from a user device, an identity sharing request of a citizen including an identification of a service provider with which to share the identity;
    determining one or more digital identification credentials that are to be shared with the service provider based on the identity sharing request;
    receiving an authorization from the citizen comprising an approval for sharing the one or more digital identification credentials;
    retrieving, via a payment network, a digital copy of an official document verifying the one or more digital identification credentials of the citizen via an application programming interface (API) of an identity record providing device; and
    transmitting information about the retrieved digital copy of the official document to a service provider device based on the identification of the service provider.

2. The method of claim 1, wherein the identity sharing request is generated based on a quick response (QR) code being scanned by the user device, and the QR code comprises an indication of the one or more digital identification credentials embedded therein.

3. The method of claim 1, wherein the method further comprises authenticating the citizen via the user device through a biometric authentication process, prior to receiving the authorization from the citizen.

4. The method of claim 1, wherein the official document comprises one or more of a digital birth certificate record, a digital social security record, and a digital passport record, of the citizen.

5. The method of claim 1, wherein the identity record providing device is associated with a government agency that manages the official document.

6. The method of claim 1, wherein the service provider comprises one or more of a hospital, a financial institution, a hotel, an airline, and a car-rental agency.

7. The method of claim 1, wherein the digital copy of the official document comprises personally identifiable information (PII) of the citizen.

8. The method of claim 1, wherein the retrieving comprises the digital copy of the official document being transmitted via the payment network.

9. An identity broker computing device, comprising:
    a network interface configured to receive, from a user device, an identity sharing request of a citizen including an identification of a service provider with which to share the identity; and
    a processor configured to
        determine one or more digital identification credentials that are to be shared with the service provider based on the identity sharing request, receive an authorization from the citizen comprising an approval for sharing the one or more digital identification credentials of the citizen, retrieve, via a payment network, a digital copy of an official document verifying the one or more digital identification credentials of the citizen via an application programming interface (API) of an identity record providing device, and transmit information about the retrieved digital copy of the official document to a service provider device based on the identification of the service provider.

10. The identity broker computing device of claim 9, wherein the identity sharing request is generated based on a quick response (QR) code being scanned by the user device, and the QR code comprises an indication of the one or more digital identification credentials embedded therein.

11. The identity broker computing device of claim 9, wherein the processor is further configured to authenticate the citizen via the user device through a biometric authentication process, prior to receiving the authorization from the citizen.

12. The identity broker computing device of claim 9, wherein the official document comprises one or more of a digital birth certificate record, a digital social security record, and a digital passport record, of the citizen.

13. The identity broker computing device of claim 9, wherein the identity record providing device is associated with a government agency that manages the official document.

14. The identity broker computing device of claim 9, wherein the digital copy of the official document comprises personally identifiable information (PII) of the citizen.

15. A non-transitory computer readable medium having stored therein instructions that when executed cause a computer to perform a method comprising:

receiving, from a user device, an identity sharing request of a citizen including an identification of a service provider with which to share the identity;

determining one or more digital identification credentials that are to be shared with the service provider based on the identity sharing request;

receiving an authorization from the citizen comprising an approval for sharing the one or more digital identification credentials;

retrieving, via a payment network, a digital copy of an official document verifying the one or more digital identification credentials of the citizen via an application programming interface (API) of an identity record providing device; and transmitting information about the retrieved digital copy of the official document to a service provider device based on the identification of the service provider.

16. The non-transitory computer readable medium of claim 15, wherein the identity sharing request is generated based on a quick response (QR) code being scanned by the user device, and the QR code comprises an indication of the one or more digital identification credentials embedded therein.

17. The non-transitory computer readable medium of claim 15, wherein the method further comprises authenticating the citizen via the user device through a biometric authentication process, prior to receiving the authorization from the citizen.

18. The non-transitory computer readable medium of claim 15, wherein the official document comprises one or more of a digital birth certificate record, a digital social security record, and a digital passport record, of the citizen.

* * * * *